Jan. 6, 1970  JEAN-CLAUDE LUCAS  3,487,625
FILTER
Filed Jan. 17, 1966  3 Sheets-Sheet 1

INVENTOR
Jean-Claude Lucas
BY Bauer and Seymour
ATTORNEYS

Jan. 6, 1970  JEAN-CLAUDE LUCAS  3,487,625
FILTER
Filed Jan. 17, 1966  3 Sheets-Sheet 3
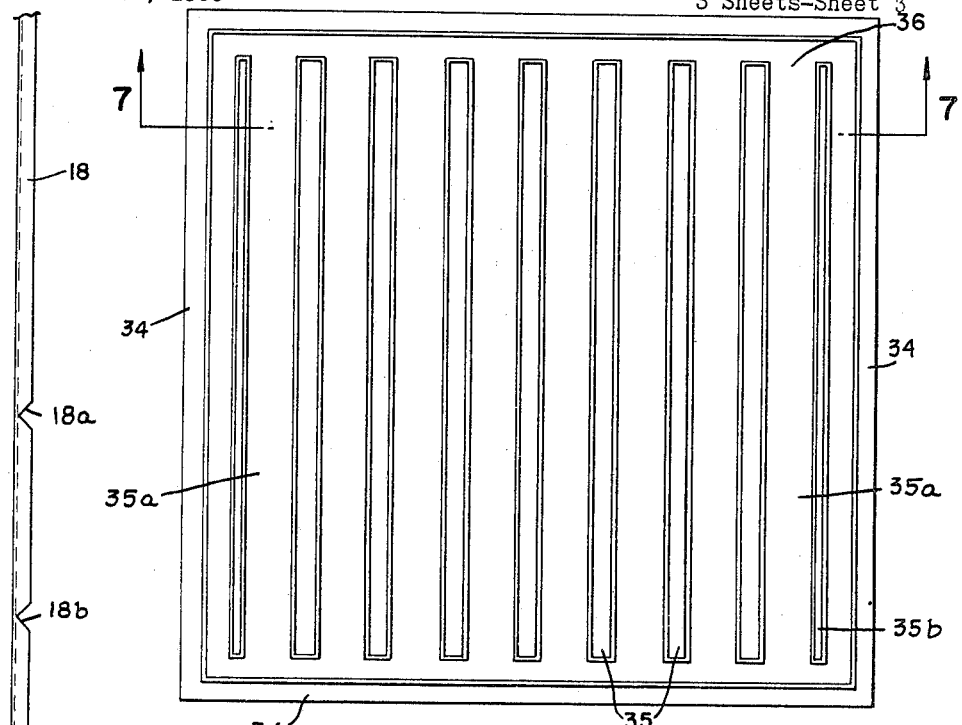
FIG.6.
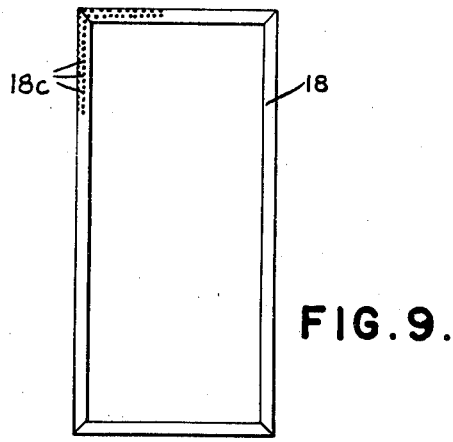
FIG.8.
FIG.9.
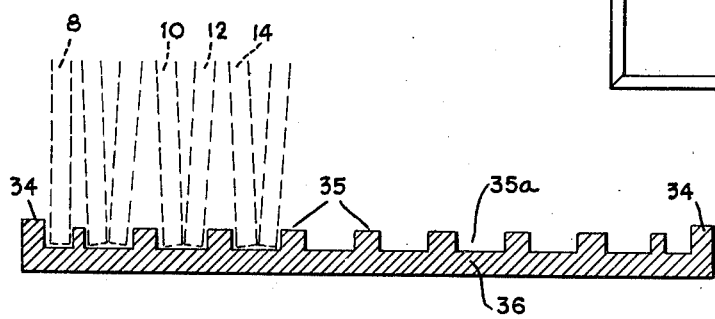
FIG.7.
INVENTOR
Jean-Claude Lucas
BY Bauer and Seymour
ATTORNEYS

United States Patent Office 3,487,625
Patented Jan. 6, 1970

3,487,625
FILTER
Jean-Claude Lucas, Fontenay-aux-Roses, France, assignor to Saint-Gobain Techniques Nouvelles, Courbevoie, France
Filed Jan. 17, 1966, Ser. No. 521,106
Int. Cl. B01d 46/52
U.S. Cl. 55—483                                              1 Claim

ABSTRACT OF THE DISCLOSURE

A filter apparatus provided with opposed side walls and top and bottom walls provided with channels arranged in a zig-zag configuration filter frames provided with pleated filter media, arranged in a zig-zag configuration, the frames being sealed in the channels and to each other along the sides of the frames by a sealing compound.

---

This invention relates to high-efficiency filters such as are used in filtering gases to remove extremely small radioactive particles, and which are termed "absolute" because they effect a substantially total separation of particles from the gas.

It is the chief purpose of the invention to provide an improved manufacture of filter cells or units of the type aforesaid. It is a further object to provide an improved filter unit complete with housing and filter panels assembled therein.

The filtration cells are, in general, formed by the juxtaposition in a rigid housing, of metal for example, of elementary parts which for brevity are termed "dihedrals." Each of these dihedrals consists of a pair of identical rectangular filter panels joined along one meeting edge of each and so related that their respective planes which substantially intersect along these meeting edges, make a small angle. Each panel includes a frame formed from a length of metallic channel, U-shaped in cross section and having appropriately-spaced 90° notches formed in its side walls. The channel is then bent at 90° at these notches to define a closed rectangular frame whose meeting edges are soldered or welded. These frames contain the pleated filter paper. Each pair of frames are connected along a contacting edge of each, by placing these edges in a mold having a low extending about its periphery and containing a plastic sealing material or compound. This operation is effected individually for each of the elements, or panels, to form dihedrals. The dihedrals thus formed are then placed in a housing having two opposite sides open. The side edges of the dihedrals not previously joined are then connected by placing them in a flat shallow tray containing a luting or sealing compound or cement. Next the joints between the ends of the dihedrals in contact with the end walls of the housing, are sealed with compound and, finally, the joints between the end ones of the two terminal dihedrals are sealed in a like manner to the end walls of the housing.

The apparatus of the invention is readily and conveniently made in an economical and relatively inexpensive manner which requires only a small number of easily fabricated unitary and relatively simple parts all of which are capable of being stored and transported with minimum requirements of space.

Thus another object of the invention is the provision of a filter composed of individual panels or elements of folded or pleated filter paper and secured within a housing having imperforate end walls, two opposite side walls, with the second two opposite sides open for the entry and exit respectively, of gas.

The filter is characterized chiefly by the following features:

(1) Each panel or individual element comprises pleated or folded filter paper contained in an orderly arrangement within and coplanar with a rectangular frame preferably of metal, of channel or U-shape in cross section and provided over its area with a regular pattern of perforations;

(2) Two discrete panels are united along a contiguous edge of each and so related that the respective planes of the two are at a small angle, to thus form a dihedral or element;

(3) The casing or housing is formed with oppositely disposed walls each provided along its edges with shallow inward projections regularly spaced therealong, each contiguous pair of projections being located and spaced to receive between them and to correctly locate a pair of panels at their meeting edges;

(4) The housing is assembled by uniting two sheets in vertically-spaced relation by means of two end sheets, all of metal or other suitable material and united along their meeting edges by metal screws. All joints are then made gas-tight by using a rubber-base or like sealing compound;

(5) The individual filter units or dihedrals are juxtaposed in the housing by placing the connected edges of each pair of panels within the corresponding spaces between projections along the opposite edges of one open side of the housing, and placing the contacting or contiguous edges of the panels of two adjacent units or dihedrals within the corresponding spaces between projections spaced along the opposite edges of the other open side, to thus create a continuous zig-zag or accordion arrangement of panels;

(6) The second wall or closed side of the housing is emplaced and connected in the same relation with the filter elements as the other side wall originally laid down;

(7) The housing with its filter units therein is then turned with one open side downwardly so that each pair of contacting edges of the panels fits within a respective channel of a specially prepared and constructed mold, a sealing compound such as a thermosetting resin having been previously deposited over the bottom surface of the mold, whereby the edges of the panels within the channels of the mold are enrobed and sealed in plastic;

(8) The housing is then lifted, turned 180° and again lowered until each pair of contacting edges at the other side of the housing are within the respective channels of the mold and are likewise enrobed in plastic and sealed together in gas-tight relation;

(9) The end panels are successively sealed along the edge of each in contact with a respective one of the end walls of the housing, by use of a polymerizable resin such as polyester, or a refractory non-shrinking cement.

Thus the filter panels are sealed to each other, to the two side walls and the two end walls, to complete a gastight unit wherein gas can flow from one open side to the other, only by passing through the filter paper of the panels.

Another object is to provide a complete filter constructed in accordance with the procedure just described.

The invention will be understood from a study of the following detailed description, in connection with the accompanying drawing.

In the drawing:

FIGURE 6 is a plan view of a mold used in the sealing of the edge joints between contiguous panels;

FIGURE 7 is a section taken in a plane identified by line 7—7, FIGURE 6;

FIGURE 8 is a detail view showing a portion of one channel strip before bending into rectangular form to constitute the frame of a panel; and FIGURE 9 is a face view of the strip of FIGURE 8 after it has been bent into rectangular form, the meeting ends and edges secured together and the strip perforated.

Figures 1, 2, 3:
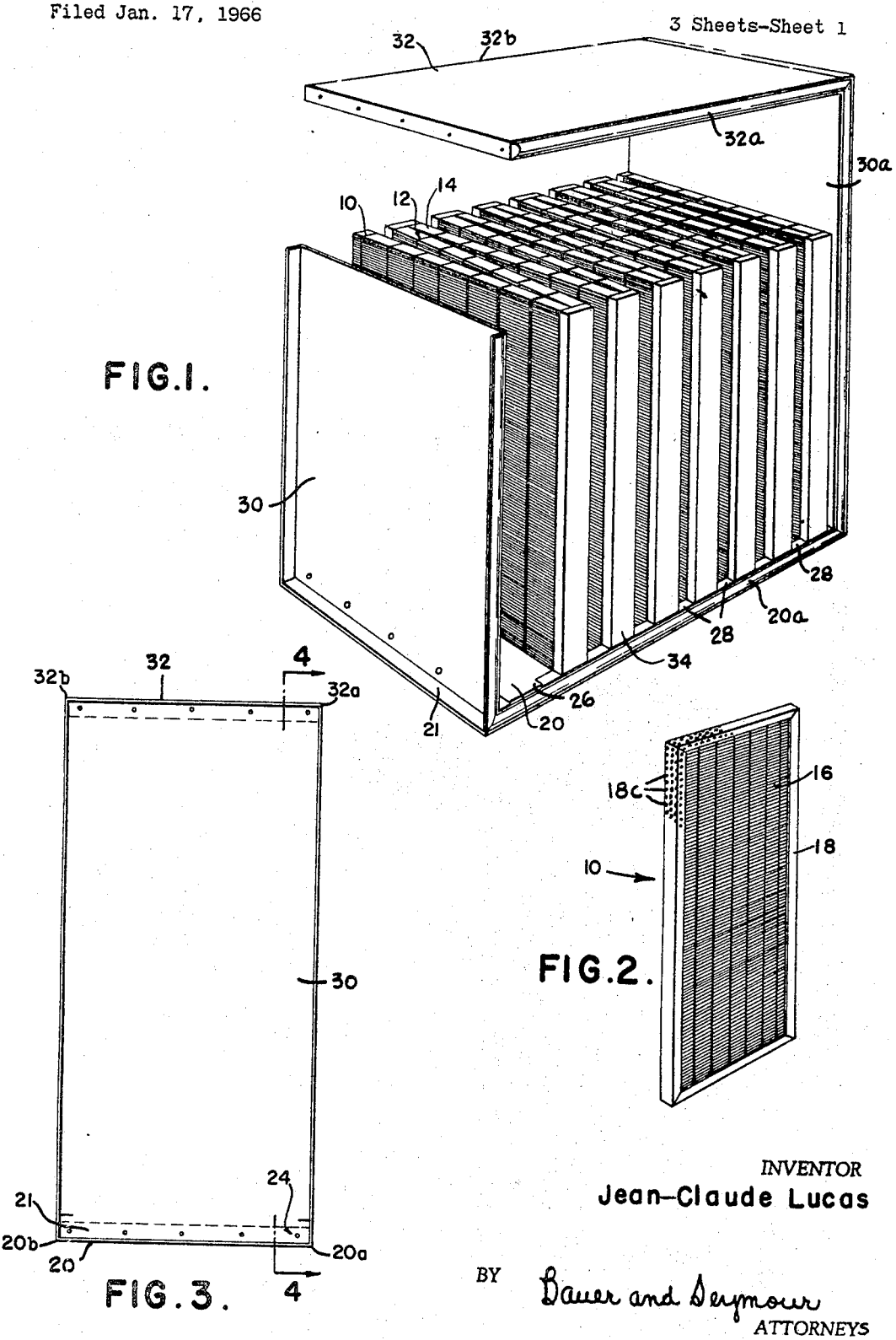
FIGURE 1 is a perspective view of the assembled filter, with a portion of one end and the filter panels cut away at their tops to better illustrate details of construction.
FIGURE 2 is a perspective view of one of the duplicate filter panels embodied in the assembly.
FIGURE 3 is an end elevation of the filter housing.

Referring in detail to the drawing, the filter includes a number of identical panels 10, 12, 14, etc. Each panel consists of a frame such as a metallic channel strip 18, FIGURES 2, 8 and 9, of U-shape in cross section and having 90° notches such as 18a, 18b, etc., in its side walls at appropriately-spaced locations. The strip is then bent at 90° at the locations of the notches and the meeting ends of the strip and contacting edges of the notches are then soldered or welded to form a unitary rectangular frame. As indicated at 18c, FIGURES 2 and 9, the frame is pierced with a large number of regularly-spaced perforations and into which sealing compound may penetrate to more firmly unite the parts and seal the joints.

Figure 4:
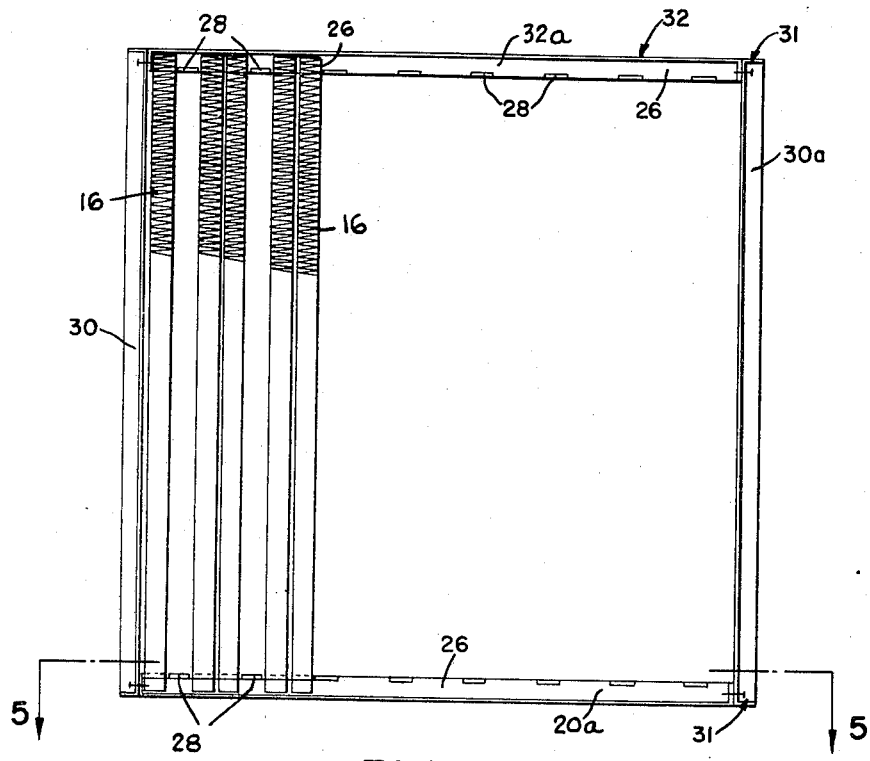
FIGURE 4 is an elevation of the filter as seen from one open side thereof and with a number of panels in place and which are shown partly in section.

Within each frame thus formed there is disposed a great length of pleated or folded filter paper as indicated at 16, FIGURES 2 and 4, so that each panel presents a very large total filtering area many times the area of the frame. In the model shown there are sixteen of these panels 10, 12, etc., in each filter cell.

The filter housing includes imperforate end walls 30, 30a, of suitable sheet material such as steel, a top wall 32, and a bottom wall 20 both of like material. The walls are connected at their meeting edges and there reinforced with metal angle bars or strips such as 21 and 22, FIGURES 3 and 5. All parts of the housing are rigidly interconnected by suitable means such as self-tapping or Parker screws 31.

Figure 5:
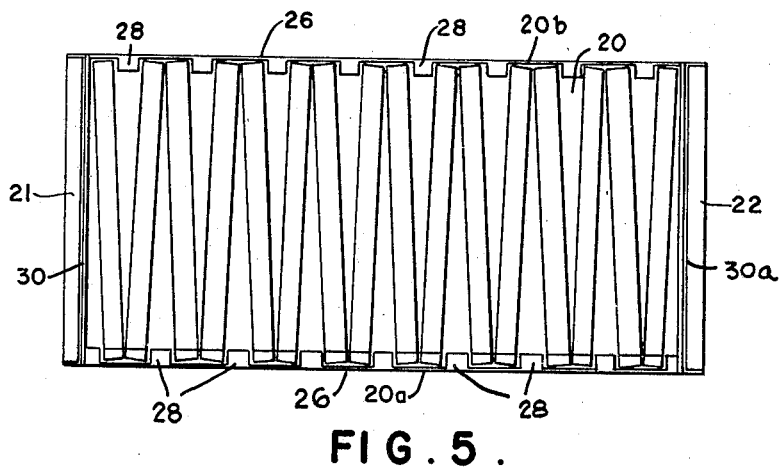
FIGURE 5 is a section taken in a plane identified by line 5—5, FIGURE 4, and showing the zigzag or accordion arrangement of filter panels.

Top wall 32 and bottom wall 20 are formed along each edge thereof with outstanding projections identified at 28, FIGURES 1, 4 and 5. The projections may be conveniently formed by pressing or stamping, or in any other suitable way. These projections are uniformly spaced along each edge as is clearly illustrated in FIGURES 1 and 5. Referring particularly to FIGURE 4 it is noted that each projection along edge 20a of bottom wall 20, is directly and vertically beneath a corresponding projection of edge 32a of top wall 32, and forms a pair therewith. Likewise each projection along edge 20b, FIGURE 5, of bottom wall 20, is directly and vertically beneath a corresponding projection of edge 32b of top wall 32 and forms a pair therewith. As shown upon FIGURE 5, the pairs of projections along edges 20a and 32a are longitudinally offset with respect to those along edges 20b and 32b by a distance equal to one-half the spacing between consecutive projections. The notches thus defined between each contiguous pair of projections, are identified at 26, FIGURES 4 and 5. The spacing between projections or tongues 28 is equal to twice the thickness of a panel. Each projection has a dimension parallel with edges 20a, 32a, etc., equal to the thickness of a panel.

In assembling the filter, top wall 32 is removed or left off. The panels are placed so that each contiguous pair has its lower corners within space 26 between a respective pair of projections 28 along edge 20a. At the other open side, along edge 20b the panels are oppositely paired to thus form the zigzag arrangement shown upon FIGURES 1 and 5 and previously described. Thereafter, top wall 32 is emplaced and secured to the end reinforcements by machine or self-tapping screws, so that its projections or tongues correspondingly engage and hold the panels at their upper corners. The ends of all screws are of sufficient length to extend into the interior of the housing to assure that they are securely sealed in the manner subsequently described.

After a suitable sealing material or compound such as a thermosetting has been deposited within mold 36, FIGURES 6 and 7, the assembly is turned with one open side down and lowered or positioned so that each contacting pair of panels at that side is disposed within a respective one of channels 35a and the edges thereof are immersed and enrobed in the material and the respective pairs are sealed together in a gas-tight joint. This sealing is effectively promoted by the perforations in the frames of the panels and into which the sealing material flows to become firmly united with the material thereof.

The housing is then turned 180° so that the other open side faces downwardly and the edges of the panels at this side are immersed in the sealing material in mold 36 as indicated in dash lines of FIGURE 7. The assembly is then removed from the mold and returned to the position shown upon FIGURE 1. Depending upon the kind of sealing compound or material used, hardening thereof may be effected by heating the assembly in an oven, or by air-hardening or self-hardening in the case of an epoxy resin.

Next a suitable sealing compound or material such as a polymerizable plastic is deposited into bottom wall 20 to about the level of the top edge of the projections. This material when hardened effects a gas-tight seal between the bottom wall and the edges of the panels in contact therewith. The assembly is then inverted so that top wall 32 is downwardly disposed and sealing material is deposited thereon to correspondingly seal the areas of contact between this wall and the edges of the panels in contact therewith. Like sealing material is similarly used to seal the joints between walls 20, 30, 30a and 32, and between the two individual end panels such as 8, FIGURE 7, along the line of contact between it and the respective end wall 30, 30a. Thus all joints are effectively and completely sealed, as well as all connecting screws at the locations where each extends through and into the housing.

In accordance with a variation, bottom wall 20 and top wall 32 may themselves be formed with channels which diverge and converge in the manner suggested by the panel arrangement of FIGURE 5, and in which the corresponding edges of the panels rest and within which they fit. Such a construction may be readily effected by pressing or stamping the sheet metal forming the top and bottom walls of the housing. The modification affords equally effective sealed joints and reduces the amount of sealing compound or material used for each filter since the material is then deposited only in the channels, rather than over the entire area of the top and bottom walls as in the construction previously described.

Of course it is possible to construct the improved filter by connecting the filter panels in the arrangement shown, before they are emplaced in the housing. With such a procedure, sealing of the panels in and to the housing walls will be as previously described.

I have thus provided a filter cell which fulfills all of the objects stated. The individual parts are relatively simple and inexpensive to fabricate from readily available standard shapes. They may be easily and compactly shipped and stored; and they are facilely assembled and interconnected to form a filter that is reliable and efficient for its intended purpose.

While I have disclosed the form of the invention presently preferred by me, numerous changes of shape, form and association of parts will readily occur to those skilled in the art, after a study of the foregoing disclosure. Hence the disclosure is to be taken in an illustrative rather than a limiting sense; and all modifications and variations within the scope of the subjoined claims, are reserved.

In the claims the expression "successive pair of panels" means that, starting from one end wall, the first and second panels constitute a first pair, the second and third panels constitute a second pair, and so on to the other end wall.

Having fully disclosed the invention, what I claim and desire to secure by Letters Patent of the United States is:

1. A high efficiency gas filter comprising, top, bottom and end walls interconnected along their meeting edges to form a housing open at its opposite sides, a plurality of rectangular filter panels disposed in pleated arrangement within said housing, each said panel comprising a rigid rectangular frame and a length of pleated sheet filter material secured in said frame to obturate the opening therethrough, against passage of solid particles, each said panel having first and second opposite edges of its frame disposed normal to the planes of said top and bottom walls and in line contact, respectively, with the panels on opposite sides thereof, each said frame having its top and bottom sides in contact with the top and bottom walls of said housing, respectively, sealing means connecting the frame of each said panel at and along its lines of contact with the next contiguous panels, and sealing means between the edges of the frame of each panel along its line of contact with the top and bottom walls of said frame, said top and bottom walls being formed with channels disposed in zig-zag arrangement and extending diagonally thereacross between the free edges of said top and bottom walls, each said panel fitting within a respective one of said channels, said first-named sealing means being disposed in and along said channels.

References Cited

UNITED STATES PATENTS

| | | | |
|---|---|---|---|
| 2,198,190 | 4/1940 | Vokes | 55—497 |
| 3,026,609 | 3/1962 | Bryan | 55—510 |
| 3,144,315 | 8/1964 | Hunn | 55—521 |
| 3,158,458 | 11/1964 | Bobbit | 55—521 |
| 3,164,456 | 1/1965 | Brainerd et al. | 55—502 |
| 3,177,637 | 4/1965 | Davis | 55—497 |
| 3,183,286 | 5/1965 | Harms | 284—271 |
| 3,189,179 | 6/1965 | McMichael | 210—493 |
| 3,243,942 | 4/1966 | Burke | 55—387 |

FOREIGN PATENTS

| | | |
|---|---|---|
| 124,754 | 6/1947 | Australia. |
| 565,265 | 11/1944 | Great Britain. |
| 750,099 | 6/1956 | Great Britain. |
| 840,570 | 6/1960 | Great Britain. |
| 1,275,496 | 10/1961 | France. |

FRANK W. LUTTER, Primary Examiner

BERNARD NOZICK, Assistant Examiner

U.S. Cl. X.R.

55—484, 499, 511, 514, 521, 528; 210—493; 264—252, 268